United States Patent
Marsan et al.

(10) Patent No.: US 6,570,861 B1
(45) Date of Patent: May 27, 2003

(54) METHOD AND APPARATUS FOR ASSIGNING USE OF A RADIO FREQUENCY COMMUNICATION RESOURCE

(75) Inventors: Mark J. Marsan, Elmhurst, IL (US); Leigh M. Chinitz, Silver Spring, MD (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/196,996

(22) Filed: Nov. 20, 1998

(51) Int. Cl.[7] ................................. H04Q 7/00
(52) U.S. Cl. ....................... 370/330; 370/332
(58) Field of Search ................. 370/332, 337, 370/322, 347, 349, 321, 331, 508, 280, 329, 330, 343, 344, 345, 348; 455/509, 443, 62, 450, 452, 436, 438, 439, 513

(56) References Cited

U.S. PATENT DOCUMENTS

| | | | |
|---|---|---|---|
| 5,159,593 A | * 10/1992 | D'Amico et al. | 370/332 |
| 5,579,306 A | * 11/1996 | Dent | 370/330 |
| 5,579,373 A | 11/1996 | Jang | |
| 5,729,539 A | * 3/1998 | Heeschen et al. | 370/332 |
| 5,822,686 A | * 10/1998 | Lundberg et al. | 455/161.3 |
| 6,018,663 A | * 1/2000 | Karlsson et al. | 455/450 |
| 6,216,009 B1 | * 4/2001 | Barnett | 455/510 |
| 6,259,685 B1 | * 7/2001 | Rinne et al. | 370/330 |

FOREIGN PATENT DOCUMENTS

| | | |
|---|---|---|
| EP | 472511 A3 | 2/1992 |
| EP | 472511 A2 | 2/1992 |
| EP | 546 720 A1 | 6/1993 |
| GB | 2235853 A | 3/1991 |
| GB | 2257336 A | 1/1993 |
| GB | 2290928 A | 1/1996 |
| WO | WO95/29567 | 11/1995 |

* cited by examiner

*Primary Examiner*—Dang Ton
*Assistant Examiner*—Alexander O. Boakye
(74) *Attorney, Agent, or Firm*—Steven A. May; Jeffrey K. Jacobs

(57) ABSTRACT

A radio communication system assigns use of a radio frequency communication resource comprising multiple communication channels in a way that minimizes the likelihood that a weakly received signal will be interfered with by a strongly received signal in an adjacent communication channel. The communication system determines a signal strength of a signal received from a user of the communication resource and, based on the signal strength determination, assigns the user one or more of the communication channels that are then available.

11 Claims, 4 Drawing Sheets

METHOD AND APPARATUS FOR ASSIGNING USE OF A RADIO FREQUENCY COMMUNICATION RESOURCE

FIELD OF THE INVENTION

The present invention relates generally to wireless communication systems and, in particular, to assigning use of a radio requency communication resource.

BACKGROUND OF THE INVENTION

Economics play an important role in the design of radio communication systems. Bandwidth is limited and equipment is expensive, and therefore many schemes have been developed for multiplexing multiple users over the same physical channel. One such scheme is time division multiple access (TDMA). In a TDMA system, the radio frequency (RF) signal carrying the information is segmented into intervals called time frames. Each frame is further partitioned into assignable user blocks of time called time slots. During each time slot, the assigned user of that slot is entitled to use the full spectrum of the RF signal. In multi-carrier communication systems, time slots exist in the same point in time on adjacent frequency channels. If two different users of communication units are being served by the same base site and are occupying simultaneously transmitted time slots in adjacent frequency channels, then power from the signal of one of the two different users can potentially couple into the adjacent channel and create undesired interference (i.e., adjacent channel coupled power interference, or ACCP) for the other user.

One solution to the problem of ACCP is to design communication systems with further reduced levels of adjacent channel coupled power. However, ACCP performance is difficult to improve and improvements will generally involve a significant investment in design time and cost and an increase in the component content and cost of the final product. Another solution, proposed in U.S. Pat. No. 4,794,635, issued to Hess, is to measure the communication quality factor, i.e., the signal-to-noise plus interference ratio, for signals already occupying each one of multiple communication channels in adjacent sectors and to select a channel that has the greatest margin between the desired communication quality factor for the channel and the minimum communication quality factor among the signals already occupying the channel. However, Hess does not address the ACCP problem where the assigned signal and the occupying signals are of significantly different signal strengths. If a strong signal and a weak signal with similar communication quality factors couple the same percentage of signal power into the other signal's bandwidth, the strong signal will create a more significant ACCP problem for the weak signal than will the weak signal for the strong signal. Alternatively, a solution used by large system providers with an abundance of channels to select from is to avoid the use of adjacent frequency channels in the same base site. However, the latter solution results in a less than optimal use of system capacity and is not practical for systems that use a small number of frequency channels.

Therefore, a need exists for a method and apparatus for assigning use of a radio frequency communication resource in a manner such that ACCP is minimized while all communication channels are utilized.

DESCRIPTION OF A PREFERRED EMBODIMENT

Figure 1:
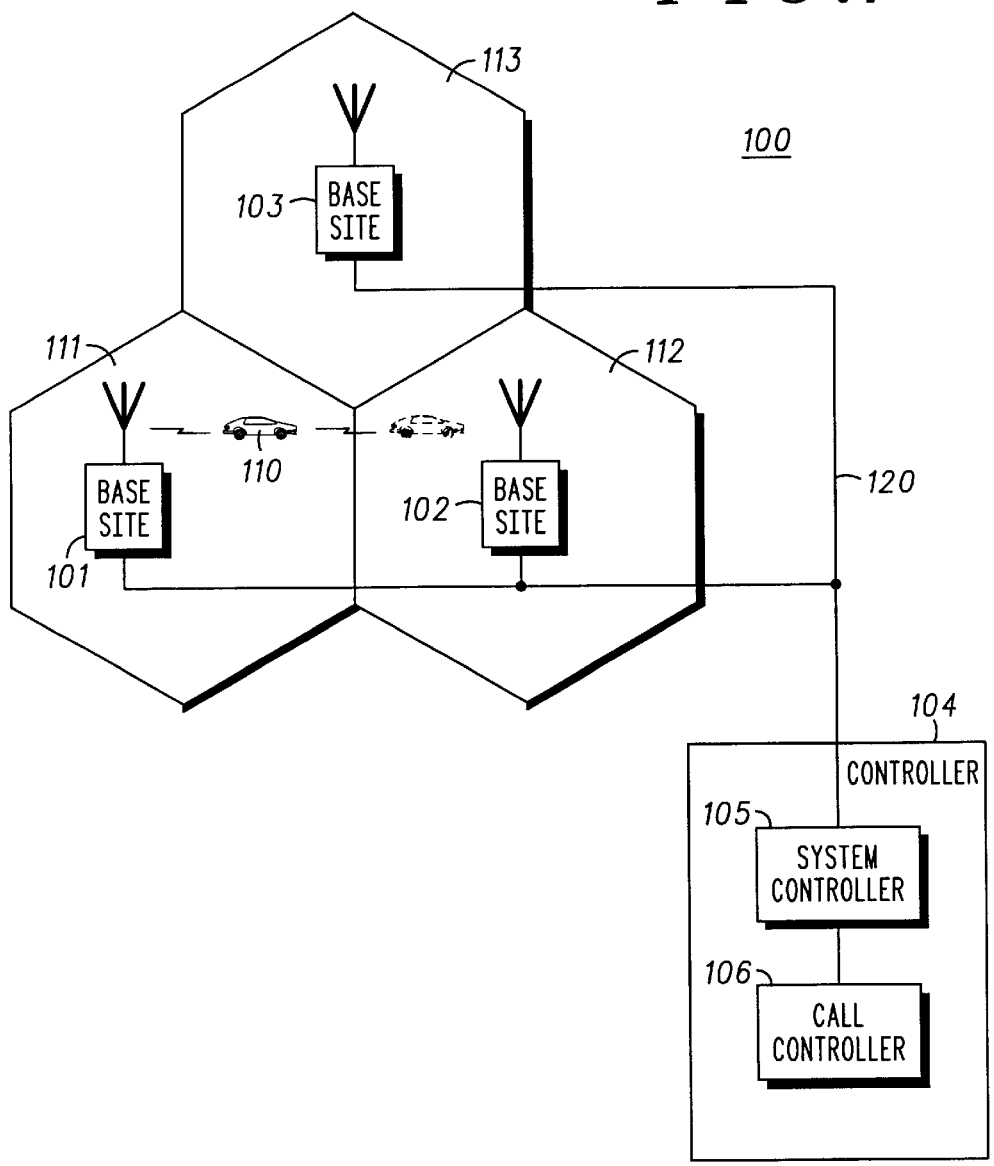
FIG. 1 is a block diagram of a communication system in accordance with a preferred embodiment of the present invention.

To address the need for a method and apparatus for assigning use of a radio frequency communication resource in a manner such that interference from adjacent channel coupled power is minimized while all communication channels are utilized, a radio communication system assigns use of a radio frequency communication resource comprising multiple communication channels in a way that minimizes the likelihood that a weakly received signal will be interfered with by a strongly received signal in an adjacent communication channel. The communication system determines a signal strength of a signal received from a user of the communication resource and, based on the signal strength determination, assigns the user one or more of the communication channels that are then available.

Generally, the present invention encompasses a method for assigning use of a radio frequency communication resource comprising multiple communication channels. The method comprises the steps of receiving a request for use of the radio frequency communication resource, determining a signal strength of the request, and assigning a communication channel of the multiple communication channels based on the request signal strength determination.

Another embodiment of the present invention encompasses a method for assigning use of a radio frequency communication resource by a communication device, wherein the radio frequency communication resource comprises a plurality of frequency channels, each frequency channel of the plurality of frequency channels comprises a plurality of time slots, a communication channel comprises one time slot of the plurality of time slots of one frequency, channel of the plurality of frequency channels, and wherein a set of time slots comprises all time slots concurrently transmitted in the plurality of frequency channels. The method comprises the steps of receiving a signal transmitted by the communication device to produce a received signal, determining a signal strength of the received signal, comparing the signal strength of the received signal to at least one signal strength threshold to produce a comparison, assigning a first communication channel of the plurality of communication channels when the signal strength of the received signal is less than the at least one signal strength threshold and assigning a second communication channel of the plurality of communication channels when the signal strength of the received signal is greater than or equal to the at least one signal strength threshold. The first communication channel is contained in a first set of time slots and the second communication channel is contained in a second, different, set of time slots. Furthermore, the first set of time slots is designated for a received signal of a signal strength less than the at least one signal strength threshold and the second set of time slots is designated for a received signal of a signal strength greater than or equal to the at least one signal strength threshold.

Finally, the present invention encompasses a communication system for assigning use of a radio frequency communication resource. The communication system comprises at least one communication unit to request use of the radio frequency communication resource, at least one base site, and at least one controller that is coupled to the base site and that controls call setup procedures and call routing procedures and monitors usage of the radio frequency communication resource. The base site comprises a receiver to receive the request for use of the radio frequency communication resource, a transmitter, and a processor coupled to the receiver and the transmitter, wherein the processor determines the signal strength of the request for use of the communication resource and assigns use of the radio frequency communication resource based on the signal strength determination.

Figure 2:
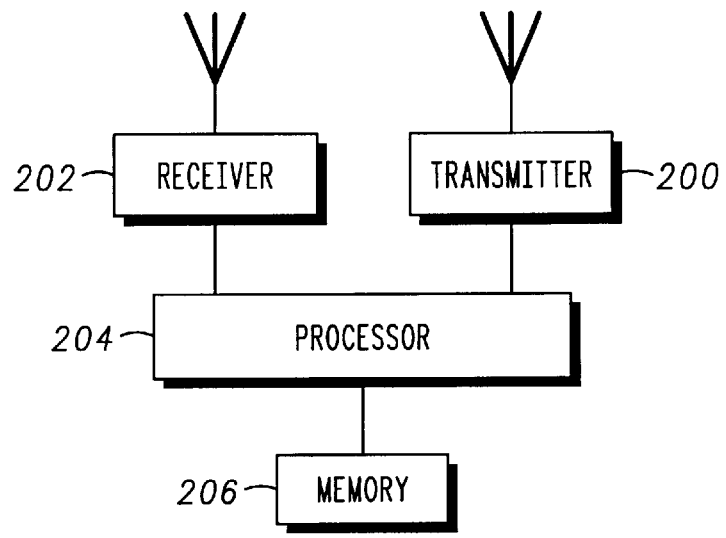
FIG. 2 is a block diagram of a base site of FIG. 1 in accordance with a preferred embodiment of the present invention.

Turning now to the drawings, wherein like numerals designate like components, FIG. 1 illustrates a radio communication system 100 in accordance with a preferred embodiment of the present invention. In the preferred embodiment, the radio communication system 100 comprises multiple geographically-diverse base sites 101–103 (three shown), a controller 104 that comprises a system controller 105 coupled to a call controller 106, and at least one communication unit 110 (one shown). Each base site 101–103 provides communication services to a corresponding service coverage area 111–113. The base sites 101–103 preferably comprise "iDEN" Enhanced Base Transceiver Sites (EBTS's) that are commercially available from Motorola, Inc. of Schaumburg, Ill. As shown in FIG. 2, each of the base sites 101–103 preferably includes a transmitter 200, a receiver 202, and a memory 206 and a processor 204 that allow the respective base sites 101–103 to store information, make computations, and run software programs.

Figure 3:
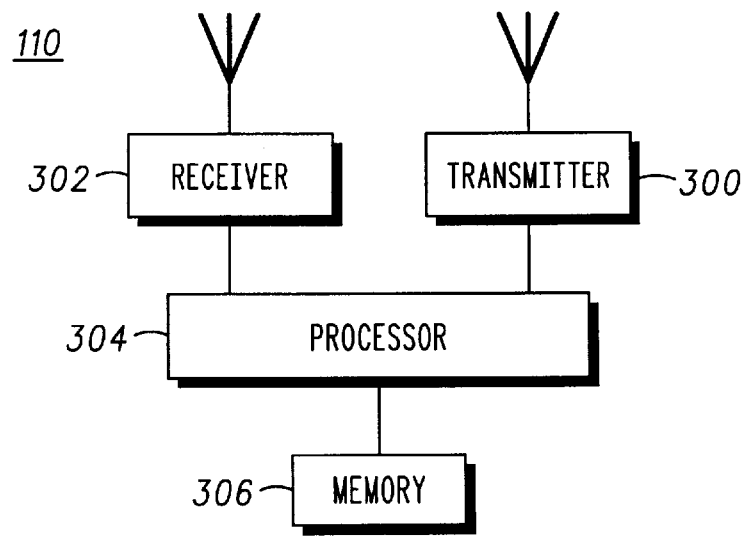
FIG. 3 is a block diagram of a communication unit of FIG. 1 in accordance with a preferred embodiment of the present invention.

The system controller 105 preferably comprises a "MOTOROLA" Access Control Gateway (ACG). The call controller 106 preferably comprises a base site controller (BSC), preferably a "MOTOROLA" Enhanced Specialized Mobile Radio (ESMR) base site controller, and a "MOTOROLA" Mobile Switching Center (MSC). The communication unit 110 preferably comprises an "iDEN" radiotelephone and, as shown in FIG. 3, preferably includes a transmitter 300, a receiver 302, a memory 306, and a processor 304. The base sites 101–103 and the controller 104 are coupled together via a network 120, such as dedicated T1 phone lines or microwave links and, along with the network 120, are collectively referred to as a fixed infrastructure.

Operation of the radio communication system 100 occurs substantially as follows in accordance with the present invention. When the communication unit 110 desires to become active in the communication system 100, the communication unit 110 transmits a request for use of a radio frequency (RF) communication resource (i.e., a call request message). Preferably the call request message comprises information concerning the target of the call request and an identifier for the communication unit 110. The call request message is received by a serving base site (e.g., base site 101) and routed by the system controller 105 to the call controller 106. The call request message serves to register the communication unit 110 with the call controller 106 in accordance with known techniques. In addition, the call controller 106 and the communication unit 110 collectively determine possible handoff base sites (e.g., base sites 102, 103) that may be used to serve the communication unit 110 in the event that the communication unit 110 needs to be handed off from the serving base site 101 to another base site (e.g., base site 102) during an active transmission.

Figure 4:
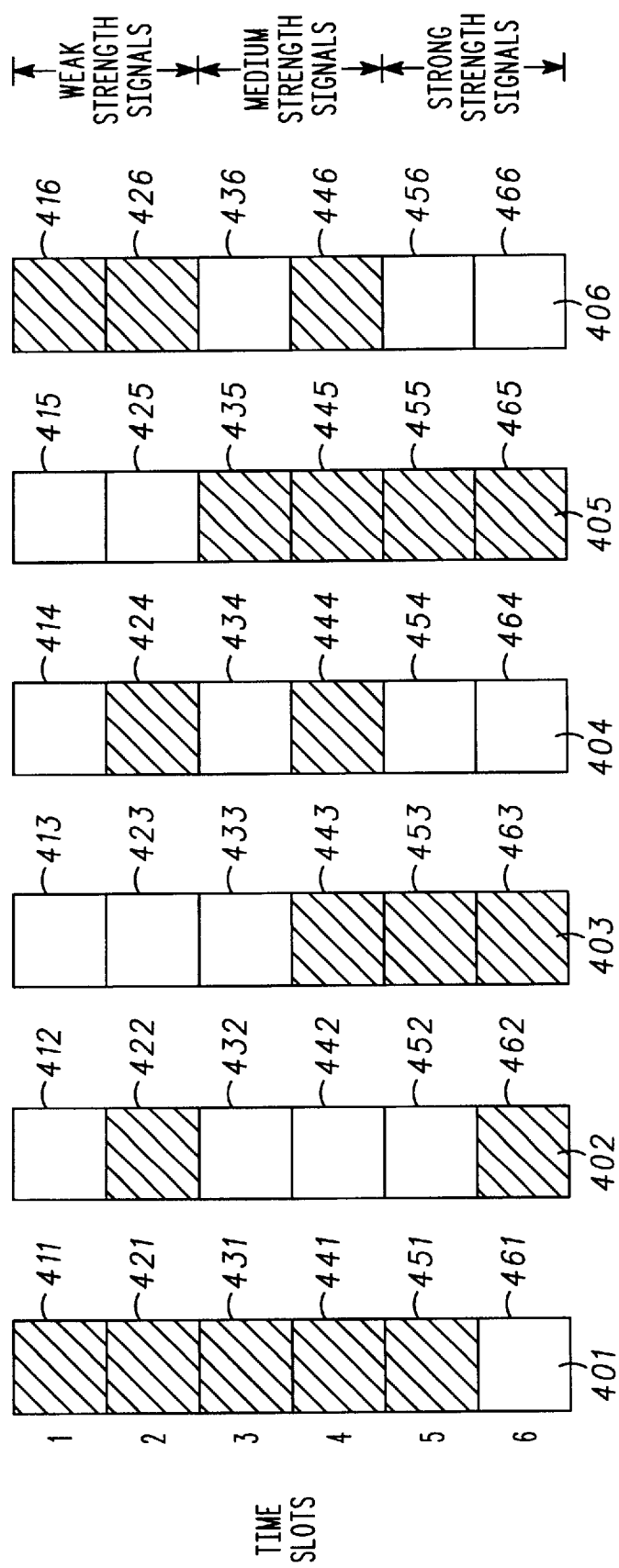
FIG. 4 is an illustration of a radio frequency communication resource comprising multiple time slots in accordance with a preferred embodiment of the present invention.

In the preferred embodiment, the call controller 106 controls the call setup and the call routing procedures and monitors the usage of the RF communication resource. In the preferred embodiment, the radio communication system 100 comprises a TDMA communication system. As illustrated in FIG. 4, an RF communication resource 400 comprises multiple RF carriers (e.g., RF carriers 401–406) and each RF carrier (e.g., RF carrier 401) comprises multiple time slots (e.g., RF carrier 401 comprises time slots 411, 421, 431, 441, 451, 461). Each RF carrier occupies a separate frequency channel (i.e., a frequency bandwidth allocated to the RF carrier) and each time slot (e.g. time slot 411) constitutes a communication channel. When the call controller 106 receives the call request message from the communication unit 110, the call controller 106 makes a determination as to whether there is at least one communication channel available for making the desired connection. When a communication channel (e.g., time slot 413) becomes available at the appropriate base site (i.e., the serving base site 101), the call controller 106 contacts the serving base site 101 and the serving base site 101 begins transmitting information to the communication unit 110 via the communication channel (i.e., time slot 413).

The processor 204 of the serving base site 101 determines a signal strength of the call request message. The processor 204 also monitors signal strengths of signals in each occupied communication channel (e.g., time slots 411, 416) and a strength of interfering signals (preferably the carrier-to-interference plus noise ratio) in each unoccupied communication channel (e.g., time slots 412–415) served by base site 101. When base site 101 is informed by the call controller 106 that at least one communication channel is available at base site 101 for use by the communication unit 110, the processor 204 assigns an available communication channel (e.g., time slot 413) to the communication unit 110 and the base site 101 transmits information concerning this assignment.

In the preferred embodiment, in assigning a time slot, the processor 204 compares the signal strength of the call request message to at least one signal strength threshold. Preferably, the at least one signal strength threshold comprises a first signal strength threshold and a second, different, signal strength threshold. When the signal strength of the request is less than both the first and second signal strength thresholds, the processor 204 assigns a first communication channel of the multiple communication channels, preferably a time slot in a first or second set of time slots (e.g., time slots 411–416, 421–426) that have been designated for signals of a signal strength less than both thresholds. When the signal strength of the request is greater than or equal to the first threshold and less than the second threshold, the processor 204 assigns a second, different, communication channel of the multiple communication channels, preferably a time slot in a third or fourth set of time slots (e.g., time slots 431–436, 441–446) that have been designated for signals of a signal strength between the two thresholds. When the signal strength of the request is greater than or equal to both thresholds, the processor 204 assigns a third communication channel, different than the first and second communication channels, of the multiplle communication channels, preferably a time slot in a fifth or sixth set of time slots (e.g., time slots 451–456, 461–466).that have been designated for signals of a signal strength greater than or equal to both thresholds. Preferably, each set of time slots comprises all time slots that are concurrently transmitted by the serving base site 101, and each one of the sets of time slots is different than the other sets of time slots.

In the preferred embodiment, when no time slot is available in the set or sets of time slots designated for signals of a strength of a call request message and at least one time slot is available in at least one alternate set of time slots, then the processor 204 assigns the communication unit 110 an available time slot in an alternate set of time slots. In assigning a time slot in an alternate set of time slots, the processor 204 determines, for each available time slot, the frequency separation between the available time slot and a nearest, in frequency, occupied time slot in the same set of time slots. Preferably, the processor then assigns the time slot with the largest frequency separation. For example, suppose that a call request message is received whose signal strength exceeds both signal strength thresholds. Furthermore, with reference to FIG. 4, suppose that time slots 5 and 6 in all six RF carriers 401–406 (i.e., time slots 451–456, 461–466) are occupied. The processor 204 determines the frequency separation between each available time slot and the closest occupied time slot in the same set of time slots (e.g., between time slots 413 and 411 and between time slots 434 and 435), and assigns the time slot with the largest frequency separation (i.e., time slot 413, time slot 414, or time slot 433).

In an alternate embodiment of the present invention, when two or more available time slots are determined, by the processor 204, to be equi-distant, in frequency, from occupied time slots nearest to each of the two or more available time slots, the processor 204 also determines a level of signal interference in each of the two or more available time slots. Assignment of a time slot is then based on the frequency separation and signal interference determinations, preferably maximizing the frequency separation and then minimizing the level of signal interference.

In a second alternate embodiment of the present invention, if the equi-distant time slots are in different sets of time slots, and the different sets of time slots are lower signal strength time slots than signal strength of the call request message, then the processor 204 assigns the time slot in the highest signal strength set of the different sets of time slots (e.g., time slot 433 would be assigned since it is in a higher signal strength set of time slots than time slots 413 and 414).

In a third alternate embodiment of the present invention, in assigning a time slot, the processor 204 compares the signal strength of the call request message to a single signal strength threshold. If the signal strength of the call request message is less than the threshold, the processor 204 assigns a first communication channel of the multiple communication channels, preferably a time slot in a first set or sets of time slots (e.g., time slots 411–416). If the signal strength of the call request message is greater than or equal to the threshold, the processor 204 assigns a second, different, communication channel of the multiple communication channels, preferably a time slot in a second set or sets of time slots (e.g., time slots 451–456). The first and second sets of time slots are different from each other and again each set of time slots comprises all time slots that are concurrently transmitted by the serving base site 101.

In a fourth alternate embodiment of the present invention, the processor 204 monitors a signal strength of each signal assigned use of the communication resource (e.g., signals in occupied time slots) to produce multiple signal strength measurements. Preferably, the processor 204 monitors the signal strength of each signal by intermittently measuring the strength of the signal. The processor 204 compares the signal strength measurements of each signal to the at least one signal strength threshold to produce multiple signal strength measurement comparisons, and, in response to undesirable variations in the comparisons, reassigns the use of the communication resource (e.g., reassigns the time slots). Preferably, a signal is reassigned a time slot because the signal strength of the signal crosses the at least one signal strength threshold. For example, as the communication unit 110 moves away from the serving base site 101, a signal received by the base site 101 from the communication unit 110 is likely to decline in strength. Suppose the communication unit 110 had been assigned a time slot in a strong signal strength set of time slots but the received signal declines in strength to the point that it falls below a signal strength threshold separating the strong signal set of time slots from a lower signal strength set of time slots. The processor 204 might reassign the communication unit 110 to a medium signal strength or weak signal strength set of time slots depending on comparisons of the strength of the received signal to the above described signal strength thresholds.

As described above, the present invention encompasses a radio communication system that provides for full use of an RF communication resource by assigning all communication channels contained in the communication resource while resolving the potential problem of adjacent channel coupled power interference (ACCP) resulting from assigning a strong signal to a communication channel adjacent in frequency and concurrent in time to a channel assigned to a weak signal. The communication system minimizes the ACCP problem by assigning the sender of a strong received signal a communication channel concurrently transmitted with communication channels occupied by other strong signals and assigning the sender of a weak received signal a communication channel concurrently transmitted with communication channels occupied by other weak signals. By minimizing the likelihood that a strong signal will be transmitted concurrent with a weak signal, the communication system minimizes the likelihood that the ACCP generated by a strong signal will create a disproportionate amount of interference for a weak signal.

The communication system accomplishes the desired communication channel assignment by determining a signal strength of a call request message that is received from a communication device and, based on the signal strength determination, assigning the sender of a strongly received request a time slot transmitted at a different time from the time slot assigned to the sender of a weakly received request. In the event that the only time slots available for a call request message of a first signal strength are time slots designated for call request messages of a second, different, signal strength, the communication system maximizes the frequency separation between a time slot assigned to the request of the first signal strength and time slots assigned to requests of the second signal strength. In selecting an available time slot of maximum frequency separation, the communication system might also consider the level of signal interference contained in available time slots of equal frequency separation. Furthermore, the communication system continually monitors occupied time slots and reassigns time slots as the received signal strength of a signal strengthens or weakens.

As the communication unit 110 moves toward the outer edge of the serving base site's coverage area 111 and into coverage area 112 (as denoted in FIG. 1 by the arrow and dashed communication unit), the communication unit 110 might determine that a radio communication needs to be handed off from the serving base site 101 to a target base site 102. Preferably, the determination is based on the measurement of a carrier-to-interference plus noise ratio (C/I+N) for signals received by the communication unit 110 from the serving base site 101 and the target base site 102. When the communication unit 110 determines that a handoff is necessary (e.g., when the C/I+N for the signals received from base site 101 degrades below the C/I+N for the signals received from base site 102), the communication unit 110 informs the controller 104 via the serving base site 101 that a handoff is necessary. The controller 104 instructs the serving base site 101 to release the communication unit 110 and instructs the target base site 102 to begin serving the communication unit 110. Once the handoff occurs, the target base site 102 transmits a control signal to the communication unit 110 informing the communication unit 110 of the handoff.

In the preferred embodiment of the present invention, the processor 204 of the target base site 102 assigns the communication unit 110 a new time slot. Similar to the above procedures, the processor 204 of the target base site 102 determines a signal strength of a signal, preferably a traffic channel communication, received from the communication unit 110. The processor 204 compares the signal strength of the received signal to at least one, and preferably two, signal strength thresholds to produce a comparison. The processor 204 then assigns a time slot, based on the comparison, as described above for call request messages.

In the preferred embodiment, when no time slot is available in the set or sets of time slots designated for signals of a strength of the received signal and at least one time slot is available in at least one alternate set of time slots, then the processor 204 assigns the communication unit 110 an available time slot in an alternate set of time slots. In assigning a time slot in an alternate set of time slots, the processor 204 makes a frequency separation determination for each available time slot per the method described above for call request messages, and preferably assigns the time slot with the largest frequency separation.

In an alternate embodiment of the present invention, when two or more available time slots are determined, by the processor 204, to be equi-distant, in frequency, from occupied time slots nearest to each of the two or more available time slots, the processor 204 also determines a level of signal interference in each of the two or more available time slots. Assignment of a time slot is then based on the frequency separation and signal interference determinations, preferably maximizing the frequency separation and then minimizing the level of signal interference.

In another alternate embodiment of the present invention, if the equi-distant time slots are in different sets of time slots, and the different sets of time slots are lower signal strength time slots than signal strength of the received signal, then the processor 204 assigns the time slot in the highest signal strength set of the different sets of time slots (e.g., time slot 433 is in a higher signal strength set of time slots than time slots 413 and 414).

In yet another alternate embodiment of the present invention, the processor 204 monitors a signal strength of each signal assigned use of the communication resource (e.g., signals in occupied time slots) to produce multiple signal strength measurements, compares the signal strength measurements of each signal to the at least one signal strength threshold to produce multiple comparisons, and, in response to undesirable variations in the comparisons, reassigns the use of the communication resource (e.g., reassigns the time slots).

As described above, the present invention encompasses a radio communication system that uses similar techniques for assignment of communication channels in situations where a pre-existing call needs to be reassigned a communication channel, such as in a handoff situation, as is used for newly initiated calls. The communication system thereby is able to fully use an RF communication resource while minimizing the potential problem of ACCP resulting from assigning a strong signal to a communication channel adjacent in frequency and concurrent in time to a channel assigned to a weak signal. Again, by assigning a strong signal a communication channel concurrently transmitted with communication channels occupied by other strong signals and a weak signal a communication channel concurrently transmitted with communication channels occupied by other weak signals, the communication system minimizes the likelihood that the ACCP generated by a strong signal will create a disproportionate amount of interference for a weak signal.

Figure 5:
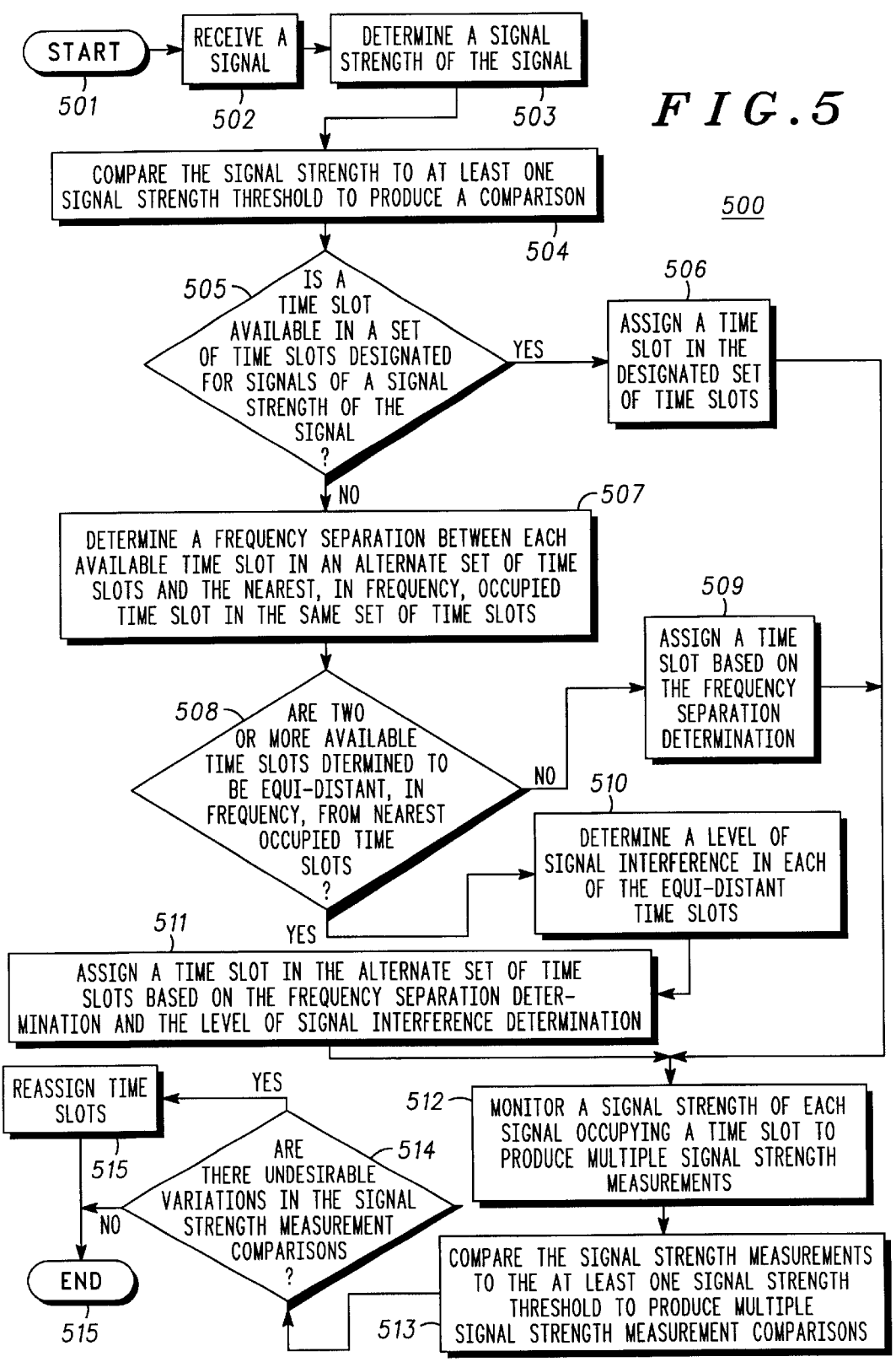
FIG. 5 is a logic flow diagram of steps executed by a communication system to assign the use of a radio frequency communication resource in accordance with a preferred embodiment of the present invention.

FIG. 5 illustrates a logic flow diagram 500 of steps executed by a communication system to assign use of an RF communication resource comprising multiple communication channels in accordance with a preferred embodiment of the present invention. The logic flow begins (501) when the communication system receives (502) a signal from a communication device. In the preferred embodiment, when a new call is being initiated, the signal comprises a request for use of a communication resource (i.e., a call request message), and when a call has already been initiated but reassignment of a communication resource is required for other reasons, such as a handoff, the signal comprises a traffic channel communication. Preferably, the communication resource comprises multiple frequency channels, each frequency channel comprises multiple time slots, and each time slot constitutes a communication channel.

In the preferred embodiment, the communication system determines (503) a signal strength of the signal. The communication system compares (504) the signal strength of the signal to at least one signal strength threshold to produce a comparison. When the communication system determines (505) that a time slot is available in a set of time slots designated for signals of a signal strength of the signal, the communication system assigns (506) a communication channel (i.e., a time slot) based on the comparison.

In the preferred embodiment, the at least one signal strength threshold comprises a first signal strength threshold and a second, different, signal strength threshold, and step of comparing (504) comprises comparing the signal strength of the request to both of the two thresholds to produce a comparison. In the preferred embodiment, when the signal strength of the request is less than both thresholds, the communication system assigns (506) the first communication channel. When the signal strength of request is greater than or equal to the first threshold and less than the second threshold, the communication system assigns (506) the second communication channel. When the signal strength of the request is greater than or equal to both thresholds, the communication system assigns (506) a third communication channel of the multiple communication channels.

In the preferred embodiment, the first, second, and third communication channels are each a different communication channel. Preferably, each of the first, second, and third communication channels comprise one time slot in a respective first, second, and third set or sets of time slots, each set of time slots comprising all time slots that are concurrently transmitted by the communication system and each set of time slots being different than the other sets of time slots.

In the preferred embodiment of the present invention as illustrated in FIG. 5, when the communication system determines (505) that no time slot is available in the set or sets of time slots designated for a signal of a designated signal strength, the communication system determines (507) a frequency separation between each available time slot in an alternate set of time slots and a nearest, in frequency, occupied time slot in the same set of time slots. The communication system then assigns (509) a time slot in the alternate set of time slots based on the frequency separation determination. Preferably, the assignment of an available time slot in the alternate set of time slots is based on maximizing the frequency separation between the time slot that is assigned and the nearest occupied time slot.

In the preferred embodiment, if the communication system determines (508) that two or more available time slots in the alternate set of time slots are equi-distant, in frequency, from the nearest occupied time slots, the communication system determines (510) a level of signal interference in the two or more equi-distant time slots. The communication system then assigns (511) a time slot in the alternate set of time slots based on the frequency separation determination and the signal interference determination. Preferably, the time slot assigned is the time slot comprising the maximum frequency separation and the minimum level of signal interference. Furthermore, if the equi-distant time slots are in different sets of time slots, and the different sets of time slots are lower signal strength time slots than the signal strength of the received signal, then, preferably, the assigned time slot is the time slot in the highest signal strength set of the different sets of time slots.

In an alternate embodiment of the present invention as illustrated in FIG. 5, the communication system monitors (512) a signal strength of at least one signal occupying an assigned time slot and compares (513) the monitored signal strength to at least one signal strength threshold to produce multiple signal strength measurement comparisons. When the communication system determines (514) that there are undesirable variations in the comparison, the communication system reassigns (515) time slots for the signal in response to the variations. For example, if a signal assigned a time slot in a strong signal strength set of time slots declines in strength to the point that it falls below the signal strength threshold separating the strong signal strength set of time slots from the lower signal strength sets of time slots, the signal might be reassigned to a medium signal strength or weak signal strength set of time slots depending on comparisons of the strength of the signal to the above described signal strength thresholds. Preferably, the monitoring and reassignment would be performed by the processor 204 of a base site.

As described above, the present invention provides a method for assigning communication channels based on the signal strength of a call request message or on the signal strength of a traffic channel communication in a way that allows for all communication channels to be used while at the same time minimizing potential ACCP problems. The method accomplishes the desired communication channel assignment by determining a signal strength of a signal received from a communication device and, based on the signal strength determination, assigning the sender of a strongly received signal a time slot transmitted at a different time from the time slot assigned to the sender of a weakly received signal. In the event that the time slots available are time slots that are concurrently transmitted, the communication system maximizes the frequency separation between the time slots assigned to weakly received signals and the time slots assigned to strongly received signals. In selecting an available time slot of maximum frequency separation, the communication system also considers the level of signal interference contained in available time slots of equal frequency separation. Furthermore, the communication system continually monitors occupied time slots and reassigns time slots as the received signal strength of a signal strengthens or weakens.

Generally, the present invention provides for full use of an RF communication resource by assigning all communication channels contained in the communication resource while resolving the potential problem of ACCP resulting from assigning a strong signal to a communication channel adjacent in frequency and concurrent in time to a channel assigned a weak signal. By endeavoring to assign signals of similar strength to concurrently transmitted time slots in adjacent frequency channels, and by maximizing the frequency separation of two signals if the two signals are of different strength and nevertheless are assigned concurrently transmitted time slots, the present invention seeks to minimize the possibility that a strong signal will occupy a concurrently transmitted time slot adjacent, in frequency, to a weak signal.

The present invention optimizes communication channel usage and minimizes adjacent channel coupled power interference by assigning time slots in a first set or sets of concurrently transmitted time slots to weak signals or weak requests, time slots in a second, different, set or sets of concurrently transmitted time slots to medium strength signals or medium strength signal requests, and time slots in a third, different, set or sets of concurrently transmitted time slots to strong signals or strong signal requests. However, if a weak signal or weak request is received and no time slots are available in the first set or sets of time slots, or a medium signal or medium request is received and no time slots are available in the second set or sets of time slots, or a strong signal or strong request is received and no time slots are available in the third set or sets of time slots, then the invention assigns the sender of the signal or request a time slot in a set of time slots allocated for signals of strengths different from the sender's signal or request while maximizing the frequency separation between the time slot assigned to the sender and the other occupied time slots in that set of time slots.

While the present invention has been particularly shown and described with reference to particular embodiments thereof, it will be understood by those skilled in the art that various changes in form and details may be made therein without departing from the spirit and scope of the present invention.

We claim:

1. A method of assigning use of a radio frequency communication resource comprising a plurality of communication channels, the method comprising the steps of:

receiving a request for use of the communication resource;

determining a signal strength of the request;

assigning at least one communication channel of the plurality of communication channels based on the signal strength determination;

wherein the step of assigning comprises the steps of:
comparing the signal strength of the request to at least one signal strength threshold; and assigning a first communication channel of the plurality of communication channels when the signal strength of the request is less than the at least one signal strength threshold and assigning a second communication channel of the plurality of communication channels when the signal strength of the request is greater than or equal to the at least one signal strength threshold, wherein the first communication channel of the plurality of communication channels is different than the second communication channel of the plurality of communication channels, wherein the radio frequency communication resource comprises a plurality of frequency channels, each frequency channel of the plurality of frequency channels comprises a plurality of time slots, and a communication channel comprises one time slot of the plurality of time slots of one frequency channel of the plurality of frequency channels, wherein a set of time slots comprises all time slots concurrently transmitted in the plurality of frequency channels, wherein the first communication channel is contained in a first set of time slots and the second communication channel is contained in a second set of time slots, wherein the first set of time slots is designated for a request of a signal strength less than the at least one signal strength threshold and the second set of time slots is designated for a request of a signal strength greater than or equal to the at least one signal strength threshold, and wherein the first set of time slots is different than the second set of time slots.

2. The method of claim 1, further including the steps of:
when no time slot is available in the set of time slots designated for a request of a designated signal strength and at least one time slot is available in at least one alternate set of time slots, determining a frequency separation between each time slot of the at least one available time slot and a nearest in frequency, occupied time slot in the same set of time slots; and
assigning a time slot in the at least one alternate set of time slots based on the frequency separation determination.

3. The method of claim 2, further including the step of:
when two or more time slots of the at least one available time slot in the at least one alternate set of time slots are determined to be equi-distant, in frequency, from occupied time slots nearest to each time slot of the two or more time slots, determining a level of signal interference in each time slot of the two or more time slots; and
wherein the step of assigning a time slot in the at least one alternate set of time slots is based on the frequency separation determination and the level of signal interference determination.

4. The method of claim 1, wherein the step of assigning comprises the steps of:
comparing the signal strength of the request to at least two signal strength thresholds to produce a comparison;
assigning a first communication channel of the plurality of communication channels when the signal strength of the request is less than the at least two signal strength thresholds;
assigning a second communication channel of the plurality of communication channels when the signal strength of the request is greater than or equal to a first signal strength threshold of the at least two signal strength thresholds and less than a second signal strength threshold of the at least two signal strength thresholds;
assigning a third communication channel of the plurality of communication channels when the signal strength of the request is greater than or equal to the at least two signal strength thresholds; and
wherein the first communication channel of the plurality of communication channels, the second communication channel of the plurality of communication channels, and the third communication channel of the plurality of communication channels are each a different communication channel and the first signal strength threshold is different than the second signal strength threshold.

5. A method of assigning use of a radio frequency communication resource comprising a plurality of communication channels, the method comprising the steps of:
receiving a request for use of the communication resource;
determining a signal strength of the request; and
assigning at least one communication channel of the plurality of communication channels based on the signal strength determination;
when at least one communication channel is assigned and is occupied by a signal, monitoring the signal strength of the signal occupying the at least one assigned communication channel to produce a plurality of signal strength measurements;
comparing each signal strength measurement of the plurality of signal strength measurements to the at least one signal strength threshold to produce a plurality of signal strength measurement comparisons; and
reassigning the signal occupying the at least one assigned communication channel to a different communication channel of the plurality of communication channels in response to undesirable variations in the plurality of signal strength measurement comparisons.

6. A method of assigning use of a radio frequency communication resource by a communication device, wherein the radio frequency communication resource comprises a plurality of frequency channels, each frequency channel of the plurality of frequency channels comprises a plurality of time slots, and a communication channel comprises one time slot of the plurality of time slots of one frequency channel of the plurality of frequency channels, the method comprising the steps of:
receiving a signal transmitted by the communication device to produce a received signal;
determining a signal strength of the received signal;
comparing the signal strength of the received signal to at least one signal strength threshold to produce a comparison;
assigning a first communication channel of the plurality of communication channels when the signal strength of the received signal is less than the at least one signal strength threshold and assigning a second communication channel of the plurality of communication channels when the signal strength of the received signal is greater than or equal to the at least one signal strength threshold;
wherein a set of time slots comprises all time slots concurrently transmitted in the plurality of frequency channels;
wherein the first communication channel is contained in a first set of time slots and the second communication channel is contained in a second set of time slots;
wherein the first set of time slots is designated for a received signal of a signal strength less than the at least one signal strength threshold and the second set of time slots is designated for a received signal of a signal strength greater than or equal to the at least one signal strength threshold; and wherein the first set of time slots is different than the second set of time slots.

7. The method of claim 6, further including the steps of:

when no time slot is available in the set of time slots designated for a received signal of a designated signal strength and at least one time slot is available in at least one alternate set of time slots, determining a frequency separation between each time slot of the at least one available time slot and a nearest, in frequency, occupied time slot in the same set of time slots; and assigning a time slot in the at least one alternate set of time slots is based on the frequency separation determination.

8. The method of claim 7, further including the step of:

when two or more time slots of the at least one available time slot in the at least one alternate set of time slots are determined to be equi-distant, in frequency, from occupied time slots nearest to each time slot of the two or more time slots, determining a level of signal interference in each time slot of the two or more time slots; and wherein the step of assigning a time slot in the at least one alternate set of time slots is based on the frequency separation determination and the level of signal interference determination.

9. The method of claim 6, wherein the at least one signal strength threshold comprises a first signal strength threshold and a second signal strength threshold, wherein the step of comparing comprises comparing the signal strength of the received signal to the first signal strength threshold and to the second signal strength threshold, and wherein the step of assigning comprises the steps of:

assigning a first communication channel of the plurality of communication channels when the signal strength of the received signal is less than both the first signal strength threshold and the second signal strength threshold;

assigning a second communication channel of the plurality of communication channels when the signal strength of received signal is greater than or equal to the first signal strength threshold and less than the second signal strength threshold;

assigning a third communication channel of the plurality of communication channels when the signal strength of the received signal is greater than or equal to both the first signal strength threshold and the second signal strength threshold;

wherein the first signal strength threshold is different than the second signal strength threshold;

wherein the first communication channel is contained in a first set of time slots, the second communication channel is contained in a second set of time slots, and the third communication channel is contained in a third set of time slots;

wherein the first set of time slots is designated for a received signal of a signal strength less than both the first signal strength threshold and the second signal strength threshold, the second set of time slots is designated for a received signal of a signal strength greater than or equal to the first signal strength threshold and less than the second signal strength threshold, and the third set of time slots is designated for a received signal of a signal strength greater than or equal to both the first signal strength threshold and the second signal strength threshold; and wherein the first set of time slots, the second set of time slots, and the third set of time slots are different sets of time slots.

10. The method of claim 6, wherein the method further comprises the steps of:

when at least one communication channel is assigned and is occupied by a signal, monitoring the signal strength of the signal occupying the at least one assigned communication channel to produce a plurality of signal strength measurements;

comparing each signal strength measurement of the plurality of signal strength measurements to the at least one signal strength threshold to produce a plurality of signal strength measurement comparisons; and reassigning the signal occupying the at least one assigned communication channel to a different communication channel of the plurality of communication channels in response to undesirable variations in the plurality of signal strength measurement comparisons.

11. A communication system for assigning use of a radio frequency communication resource comprising:

a receiver to receive a radio frequency signal;

a transmitter;

a processor coupled to the receiver and the transmitter, wherein the processor determines a signal strength of the radio frequency signal and assigns use of the radio frequency communication resource based on the signal strength determination;

wherein the radio frequency signal comprises a request for use of the radio frequency communication resource;

wherein the processor monitors a signal strength of a signal using the communication resource and compares the signal strength of the monitored signal to at least one signal strength threshold;

wherein the processor reassigns the use of the radio frequency communication resource by the monitored signal based on the comparison of the signal strength of the monitored signal to the at least one signal strength threshold;

wherein the radio frequency communication resource comprises a plurality of frequency channels, each frequency channel of the plurality of frequency channels comprises a plurality of time slots, and a communication channel comprises one time slot of the plurality of time slots of one frequency channel of the plurality of frequency channels;

wherein a set of time slots comprises all time slots concurrently transmitted in the plurality of frequency channels;

wherein the first communication channel is contained in a first set of time slots and the second communication channel is contained in a second set of time slots;

wherein the first set of time slots is designated for a request of a signal strength less than the at least one signal strength threshold and the second set of time slots is designated for a request of a signal strength greater than or equal to the at least one signal strength threshold; and wherein the first set of time slots is different than the second set of time slots.

* * * * *